United States Patent
Liu et al.

(10) Patent No.: US 10,498,234 B2
(45) Date of Patent: Dec. 3, 2019

(54) VOLTAGE REGULATOR WITH NONLINEAR ADAPTIVE VOLTAGE POSITION AND CONTROL METHOD THEREOF

(71) Applicant: Monolithic Power Systems, Inc., San Jose, CA (US)

(72) Inventors: Chao Liu, Sunnyvale, CA (US); Daocheng Huang, Santa Clara, CA (US); Lijie Jiang, Hangzhou (CN); Wangmiao Hu, Hangzhou (CN); Jinghai Zhou, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 15/938,936

(22) Filed: Mar. 28, 2018

(65) Prior Publication Data
US 2019/0302818 A1    Oct. 3, 2019

(51) Int. Cl.
*H02M 3/156* (2006.01)
*H02M 1/00* (2006.01)
*H02M 3/158* (2006.01)

(52) U.S. Cl.
CPC .......... *H02M 3/156* (2013.01); *H02M 3/1584* (2013.01); *H02M 2001/0025* (2013.01)

(58) Field of Classification Search
CPC . H02M 2001/0025; H02M 2001/0009; H02M 3/1584; H02M 3/156; G05F 1/575; G05F 1/565
See application file for complete search history.

(56) References Cited

U.S. PATENT DOCUMENTS

| | | | |
|---|---|---|---|
| 5,306,235 A * | 4/1994 | Haynes | A61N 1/30 604/20 |
| 6,285,139 B1 * | 9/2001 | Ghanem | G01R 31/2653 307/60 |
| 7,317,306 B2 | 1/2008 | Robert | |
| 8,395,368 B2 | 3/2013 | Qian | |
| 9,473,027 B2 | 10/2016 | Yan | |
| 2012/0153055 A1 * | 6/2012 | Imai | B05B 5/0255 239/690 |

* cited by examiner

*Primary Examiner* — Kyle J Moody
*Assistant Examiner* — Peter M Novak
(74) *Attorney, Agent, or Firm* — Perkins Coie LLP

(57) ABSTRACT

A voltage regulator has a switching circuit and a control circuit. The switching circuit provides an output voltage and an output current. The control circuit provides a switching control signal to the switching circuit to adjust the output voltage, such that the output voltage decreases with a first slope as the output current increases when the output current is less than a first current level, the output voltage decreases with a second slope as the output current increases when the output current is larger than the first current level and is less than a second current level, and the output voltage decreases with a third slope as the output current increases when the output current is larger than the second current level.

18 Claims, 12 Drawing Sheets

US 10,498,234 B2

VOLTAGE REGULATOR WITH NONLINEAR ADAPTIVE VOLTAGE POSITION AND CONTROL METHOD THEREOF

TECHNICAL FIELD

The present invention generally relates to electronic circuits, and more particularly, relates to voltage regulators with adaptive voltage position and control methods thereof.

BACKGROUND

In high current voltage regulators used in laptop, desktop, server and telecom applications, adaptive voltage position (AVP) control is widely used to achieve good transient performance and reduce load power consumption. FIG. 1A illustrates the basic principle of AVP control, wherein Vout represents an output voltage of a voltage regulator, Iout represents an output current of the voltage regulator and Vref represents a reference voltage. As shown in FIG. 1A, output voltage Vout linearly decreases within a voltage tolerance window (Vmax−Vmin) as output current Iout increases, where Vmax is a permitted maximum output voltage, and Vmin is a permitted minimum output voltage.

FIG. 1B compares load transient response of voltage regulators with and without AVP control. As shown in the figure, for voltage regulators without AVP control, because of undershoot and overshoot at the output voltage Vout during load transient period, only half of the voltage tolerance window can be used. While in voltage regulators with AVP control, output voltage Vout is controlled to be slightly higher than permitted minimum output voltage Vmin at full load, and a little bit lower than permitted maximum output voltage Vmax at light load. As a result, the entire voltage tolerance window can be used during load transient period, which allows a smaller output capacitor in the voltage regulator. Furthermore, since output voltage Vout with AVP control decreases as the output current Iout increases, the output power at full load is degraded, which greatly facilitates the thermal design.

However, with fast development of electronic devices, higher and higher power is pushed on voltage regulators. The traditional AVP control may be not enough to achieve both fast transient response and safety operation within the voltage tolerance window.

SUMMARY

The embodiments of the present invention are directed to a controller used in a voltage regulator, comprising: a switching circuit, configured to receive an input voltage and provide an output voltage and an output current; and a control circuit, configured to provide a switching control signal to the switching circuit to adjust the output voltage, such that the output voltage decreases with a first slope as the output current increases when the output current is less than a first current level, the output voltage decreases with a second slope as the output current increases when the output current is larger than the first current level and is less than a second current level, and the output voltage decreases with a third slope as the output current increases when the output current is larger than the second current level.

The embodiments of the present invention are also directed to a control method used in a voltage regulator, the voltage regulator is configured to provide an output voltage and an output current, the control method comprising: sensing the output current; and adjusting the output voltage based on the output current, such that the output voltage decreases with a first slope as the output current increases when the output current is less than a first current level, the output voltage decreases with a second slope as the output current increases when the output current is larger than the first current level and is less than a second current level, and the output voltage decreases with a third slope as the output current increases when the output current is larger than the second current level.

The embodiments of the present invention are further directed to a voltage regulator, comprising: a switching circuit, configured to receive an input voltage and provide an output voltage and an output current; and a control circuit, configured to provide a switching control signal to the switching circuit to adjust the output voltage, such that the output voltage decreases with a first slope as the output current increases when the output current is less than a first current level, and the output voltage decreases with a second slope as the output current increases when the output current is larger than the first current level, wherein the first slope is larger than the second slope.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

FIGS. 2A-2D illustrate principle of nonlinear adaptive voltage position (AVP) control in accordance with embodiments of the present invention. In FIGS. 2A-2D, the X-axis represents an output current Iout, and the Y-axis represents an output voltage Vout. Line 201 characterizes a voltage regulator with traditional AVP control scheme, which varies output voltage Vout as a linear function of output current Iout. Output voltage Vout is set at a reference voltage Vref when load is idle, that is output current Iout is at a minimum current level I(0), where reference voltage Vref is a little lower than a permitted maximum output voltage Vmax. In one embodiment, reference voltage Vref is provided based on a voltage identification (VID) code from a processor load. Line 201 shows that output voltage Vout decreases with a linear slope as output current Iout increases. Output voltage Vout is regulated slightly above a permitted minimum output voltage Vmin with a voltage droop when load is full, that is output current Iout is at a maximum current level I(max). Under traditional AVP control scheme, unexpected shutdown of the processor load per under voltage of output voltage Vout may happen when output current Iout dramatically increases to maximum current level I(max). The present invention provides a solution to this problem by use of a nonlinear AVP control scheme as is shown by example of curve 202 in FIGS. 2A-2D.

Figure 1A:
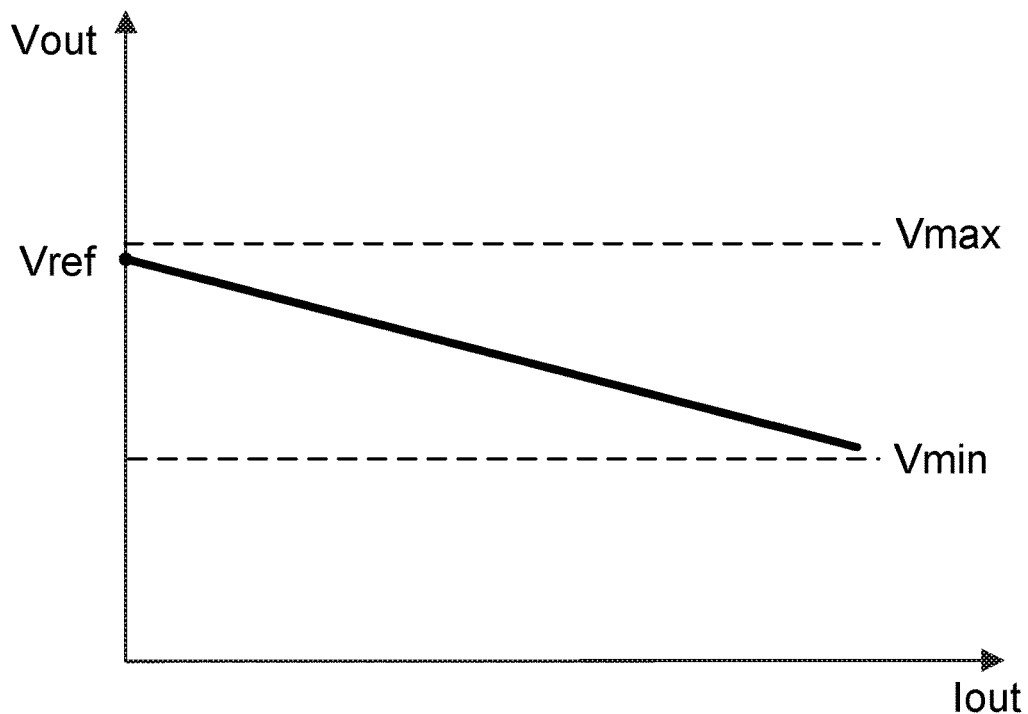
FIG. 1A illustrates the basic principle of AVP control.
Figure 1B:
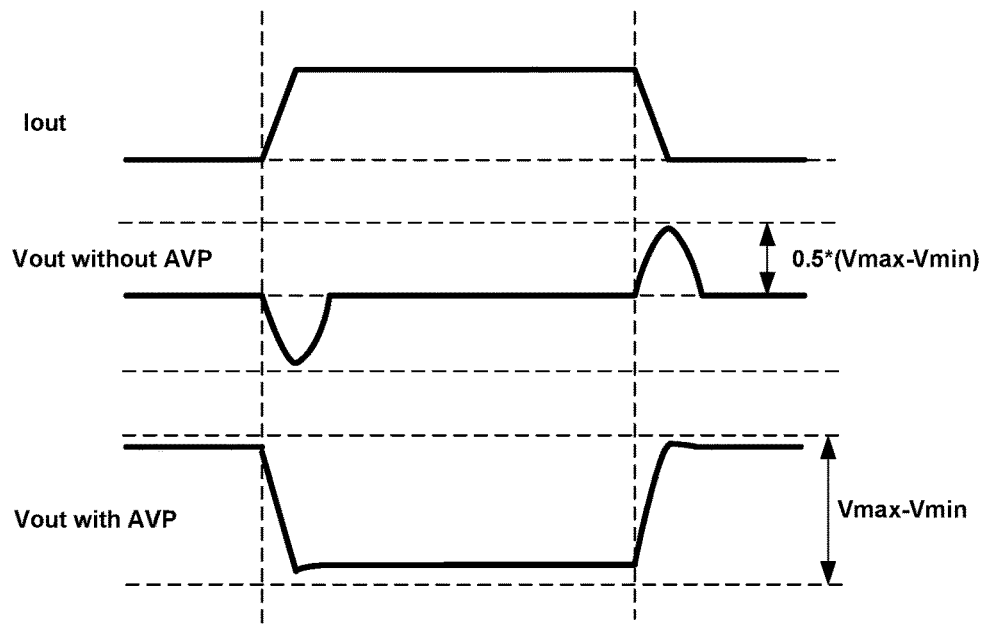
FIG. 1B illustrates waveforms of voltage regulators with and without AVP control during load transient period.
Figure 2A:
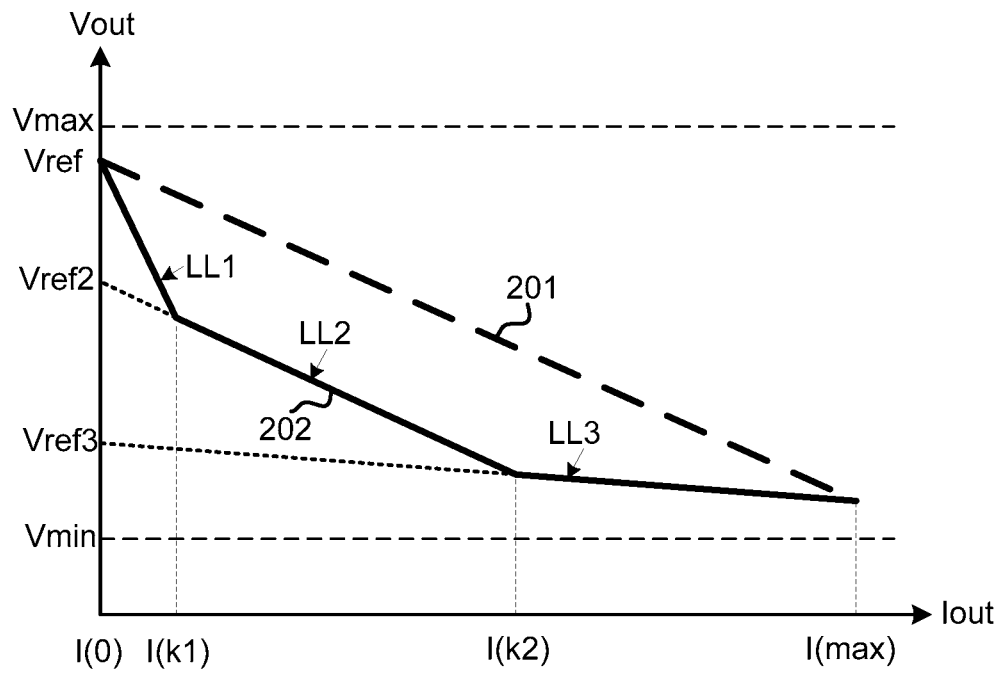
FIGS. 2A-2D illustrate principle of nonlinear AVP control in accordance with embodiments of the present invention.

Curve 202 in FIG. 2A shows a three-stage nonlinear AVP control scheme in accordance with an embodiment of the present invention. Output voltage Vout is regulated at reference voltage Vref when output current Iout is at minimum current level I(0), and output voltage Vout is regulated slightly above permitted minimum output voltage Vmin when output current Iout is at maximum current level I(max). In FIG. 2A, when output current Iout is larger than minimum current level I(0) and is less than a current level I(k1), output voltage Vout decreases with a slope LL1 as output current Iout increases, and the relationship between output voltage Vout and output current Iout can be expressed as:

$$Vout=Vref-LL1*Iout \quad (1)$$

When output current Iout is larger than current level I(k1), and is less than a current level I(k2), output voltage Vout decreases with a slope LL2 as output current Iout increases, and the relationship between output voltage Vout and output current Iout can be expressed as:

$$Vout=Vref2-LL2*Iout \quad (2)$$

where Vref2 represents a reference voltage which is lower than reference voltage Vref, and slope LL2 is smaller than slope LL1.

When output current Iout is larger than current level I(k2), and is less than maximum current level I(max), output voltage Vout decreases with a slope LL3 as output current Iout increases, and the relationship between output voltage Vout and output current Iout can be expressed as:

$$Vout=Vref3-LL3*Iout \quad (3)$$

where Vref3 represents a reference voltage which is lower than reference voltage Vref2, and slope LL3 is smaller than slope LL2. As shown in FIG. 2A, slope LL3 is quite small, and output voltage Vout decreases a little to avoid unexpected system shutdown as output current Iout increases when output current Iout is larger than current level I(k2). As a result, safety operation at full load condition is ensured.

Continuing with FIG. 2A, due to the nonlinear AVP control scheme, output voltage Vout can be set high enough at small output current Iout to reduce under shoot at fast load step up, so that enough headroom are ensured for safety operation. Furthermore, it can be seen that output voltage Vout following curve 202 is lower than the one following curve 201 within the whole load range, so power loss is reduced.

Figure 2B:
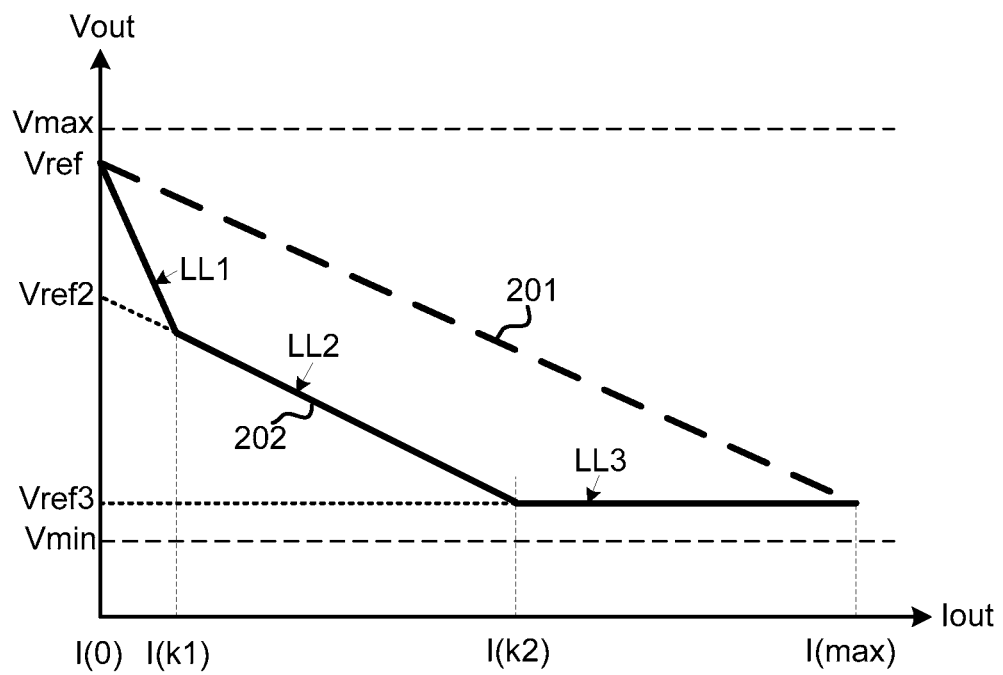

Curve 202 in FIG. 2B shows a three-stage nonlinear AVP control scheme in accordance with another embodiment of the present invention. The difference between curve 202 in FIG. 2B and FIG. 2A is that slope LL3 of curve 202 in FIG. 2B is zero. So output voltage Vout keeps at reference voltage Vref3 when output current Iout is larger than current level I(k2).

Figure 2C:
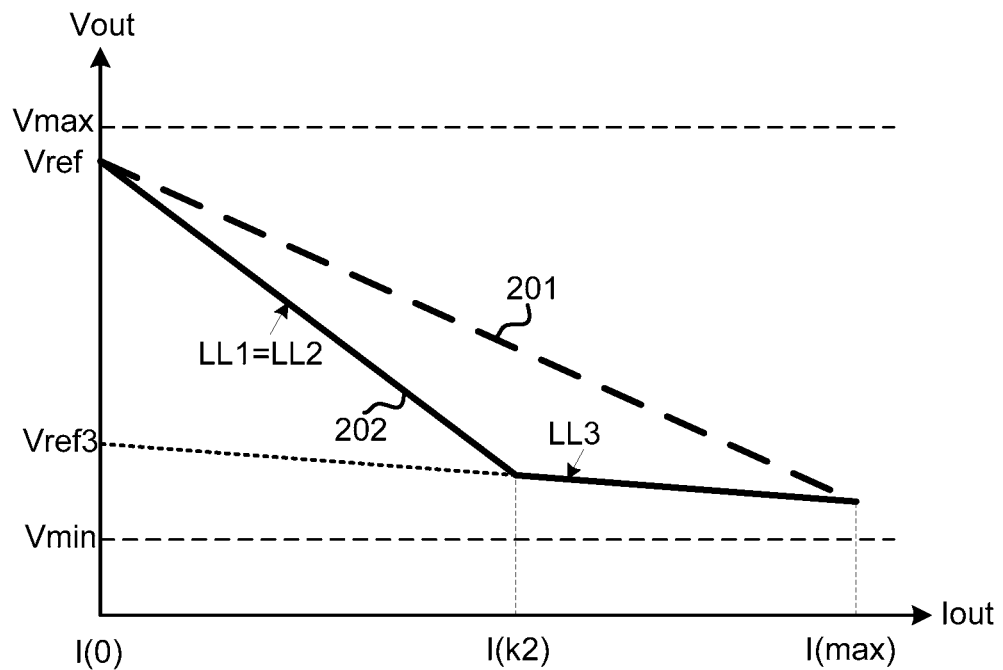

Curve 202 in FIG. 2C shows a two-stage nonlinear AVP control scheme in accordance with an embodiment of the present invention. The difference between curve 202 in FIG. 2C and FIG. 2A is that slope LL2 equals slope LL1 in FIG. 2C.

Figure 2D:
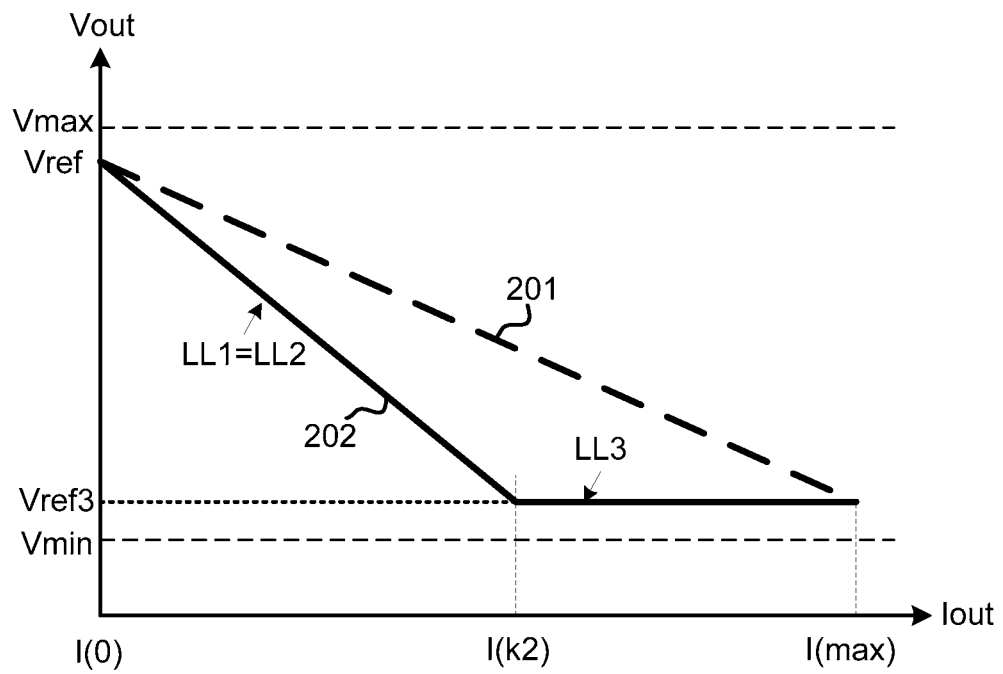

Curve 202 in FIG. 2D shows a two-stage nonlinear AVP control scheme in accordance with another embodiment of the present invention. The difference between curve 202 in FIG. 2D and FIG. 2C is that slope LL3 in FIG. 2D is zero. So output voltage Vout keeps at reference voltage Vref3 when output current Iout is larger than current level I(k2).

Figure 3:
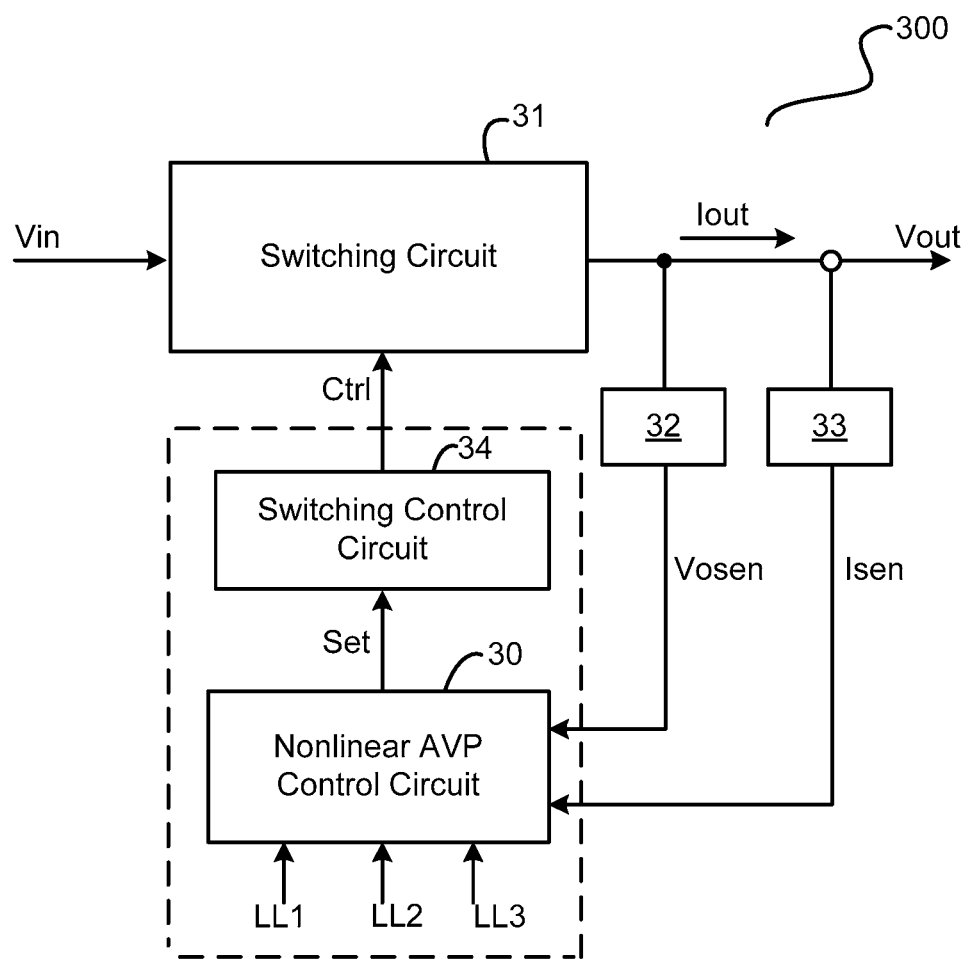
FIG. 3 schematically illustrates a voltage regulator 300 in accordance with an embodiment of the present invention.

FIG. 3 schematically illustrates a voltage regulator 300 in accordance with an embodiment of the present invention. Voltage regulator 300 comprises a switching circuit 31, a voltage sense circuit 32, a current sense circuit 33, and a control circuit comprising a nonlinear AVP control circuit 30 and a switching control circuit 34.

Switching circuit 31 is configured to receive an input voltage Vin and provide output voltage Vout and output current Iout. Voltage sense circuit 32 is configured to sense output voltage Vout and provide a voltage sense signal Vosen based on output voltage Vout. Current sense circuit 33 is configured to sense output current Iout and provide a current sense signal Isen based on output current Iout.

The control circuit is configured to provide a switching control signal Ctrl to switching circuit 31 to adjust output voltage Vout, such that output voltage Vout decreases with slope LL1 as output current Iout increases when output current Iout is less than current level I(k1), output voltage Vout decreases with slope LL2 as output current Iout increases when output current Iout is larger than current level I(k1) and is less than current level I(k2), and output voltage Vout decreases with slope LL3 as output current Iout increases when output current Iout is larger than current level I(k2).

Nonlinear AVP control circuit 30 is configured to receive voltage sense signal Vosen, current sense signal Isen, slopes LL1, LL2, and LL3, and is configured to provide a set signal Set according to output voltage Vout, output current Iout, slopes LL1, LL2 and LL3.

Switching control circuit 34 is configured to receive set signal Set from nonlinear AVP control circuit 30, and is configured to provide switching control signal Ctrl to turn ON switching circuit 31 in response to set signal Set.

Figure 4A:
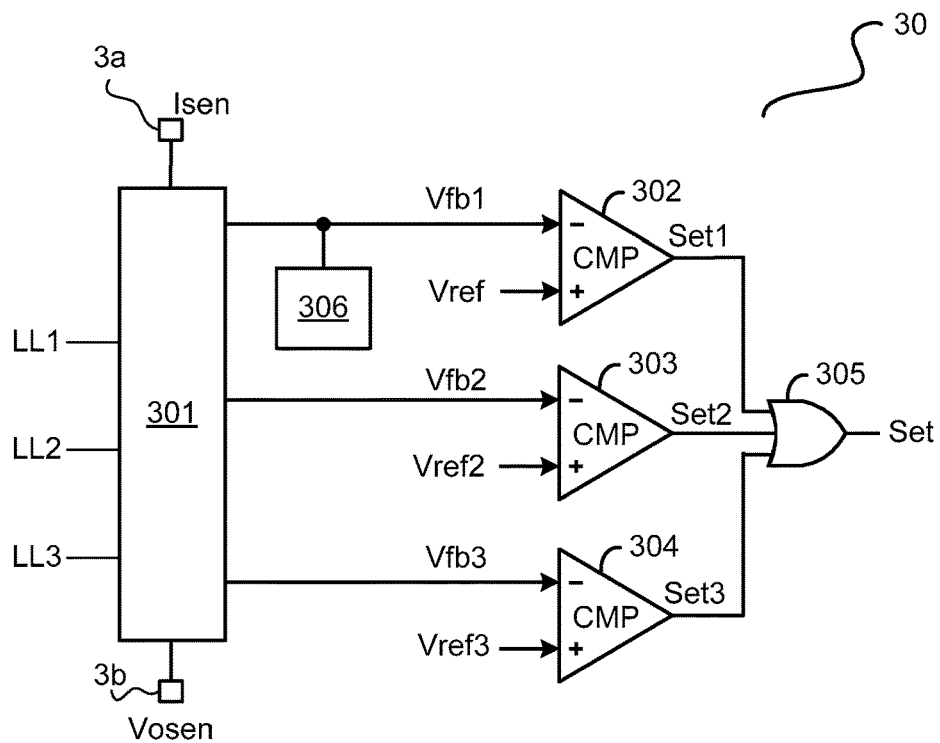
FIG. 4A schematically illustrates a nonlinear AVP control circuit 30 in accordance with an embodiment of the present invention.

FIG. 4A schematically illustrates nonlinear AVP control circuit 30 in accordance with an embodiment of the present invention. Nonlinear AVP control circuit 30 comprises a voltage generator 301, a comparator 302, a comparator 303, a comparator 304, and a logic circuit 305.

A node 3a of voltage generator 301 is coupled to current sense circuit 33 shown in FIG. 3 to receive current sense signal Isen, a node 3b of voltage generator 301 is coupled to voltage sense circuit 32 shown in FIG. 3 to receive voltage sense signal Vosen, and voltage generator 301 is configured to provide feedback signals Vfb1, Vfb2 and Vfb3 respectively.

Voltage generator 301 is configured to provide feedback signal Vfb1 in response to output voltage Vout, output current Iout, and slope LL1. In one embodiment, feedback signal Vfb1 can be expressed as:

$$Vfb1 = Vosen + Iout * LL1 \quad (4)$$

Voltage generator 301 is configured to provide feedback signal Vfb2 in response to output voltage Vout, output current Iout, and slope LL2. In one embodiment, feedback signal Vfb2 can be expressed as:

$$Vfb2 = Vosen + Iout * LL2 \quad (5)$$

Voltage generator 301 is configured to provide feedback signal Vfb3 in response to output voltage Vout, output current Iout, and slope LL3. In one embodiment, feedback signal Vfb3 can be expressed as:

$$Vfb3 = Vosen + Iout * LL3 \quad (6)$$

Comparator 302 has an inverting terminal coupled to voltage generator 301 to receive feedback signal Vfb1, a non-inverting terminal configured to receive reference voltage Vref which is used to set output voltage Vout, and an output terminal configured to provide a comparison signal Set1 based on a comparison result between feedback signal Vfb1 and reference voltage Vref. In one embodiment, feedback signal Vfb1 and/or reference voltage Vref may comprise other signals such as a slope compensation signal.

Comparator 303 has an inverting terminal coupled to voltage generator 301 to receive feedback signal Vfb2, a non-inverting terminal configured to receive a reference voltage Vref2, and an output terminal configured to provide a comparison signal Set2 based on a comparison result between feedback signal Vfb2 and reference voltage Vref2. In one embodiment, feedback signal Vfb2 and/or reference voltage Vref2 may comprise other signals such as a slope compensation signal.

Comparator 304 has an inverting terminal coupled to voltage generator 301 to receive feedback signal Vfb3, a non-inverting terminal configured to receive a reference voltage Vref3, and an output terminal configured to provide a comparison signal Set3 based on a comparison result between feedback signal Vfb3 and reference voltage Vref3. In one embodiment, feedback signal Vfb3 and/or reference voltage Vref2 may comprise other signals such as a slope compensation signal.

Logic circuit 305 is coupled to output terminals of comparators 302, 303 and 304 to receive comparison signals Set1, Set2 and Set3, and is configured to provide set signal Set based on comparison signals Set1, Set2 and Set3. In one embodiment, set signal Set is configured to turn ON switching circuit 31 when any of comparison signals Set1, Set2 and Set3 becomes at a high voltage level. In one embodiment, logic circuit 305 comprises an OR gate.

Nonlinear AVP control circuit 30 further comprises a compensator 306 to dynamically adjust slope LL1 during load transient period, such that slope LL1 dynamically deceases when output current Iout increases from less than current level I(k1). As a result, voltage droop of output voltage Vout is reduced to ensure safety operation when output current Iout dramatically increases from less than current level I(k1). In one embodiment, compensator 306 is configured to generate a droop voltage Vdroop in response to output current Iout, and further configured to provide a compensation signal to feedback signal Vfb1 via filtering droop voltage Vdroop, thus the compensation signal is sensitive to fast variation of output current Iout.

Figure 4B:
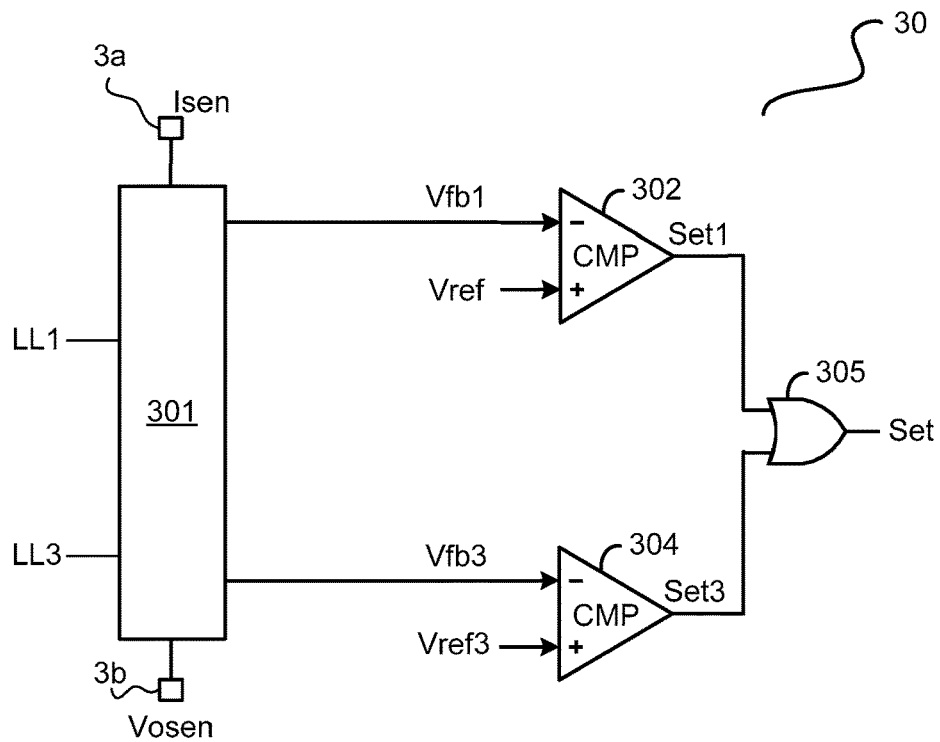
FIG. 4B schematically illustrates a nonlinear AVP control circuit 30 in accordance with another embodiment of the present invention.

In one embodiment, if slope LL1 equals slope LL2 at steady state, then feedback signal Vfb1 equals feedback signal Vfb2, and comparator 303 is disabled corresponding to two-stage nonlinear AVP control scheme shown in FIG. 2C and FIG. 2D. FIG. 4B schematically illustrates nonlinear AVP control circuit 30 implementing two-stage nonlinear AVP control scheme in accordance with an embodiment of the present invention. The embodiment shown in FIG. 4B has voltage generator 301, comparator 302, comparator 304 and logic circuit 305 similarly as FIG. 4A.

Figure 5:
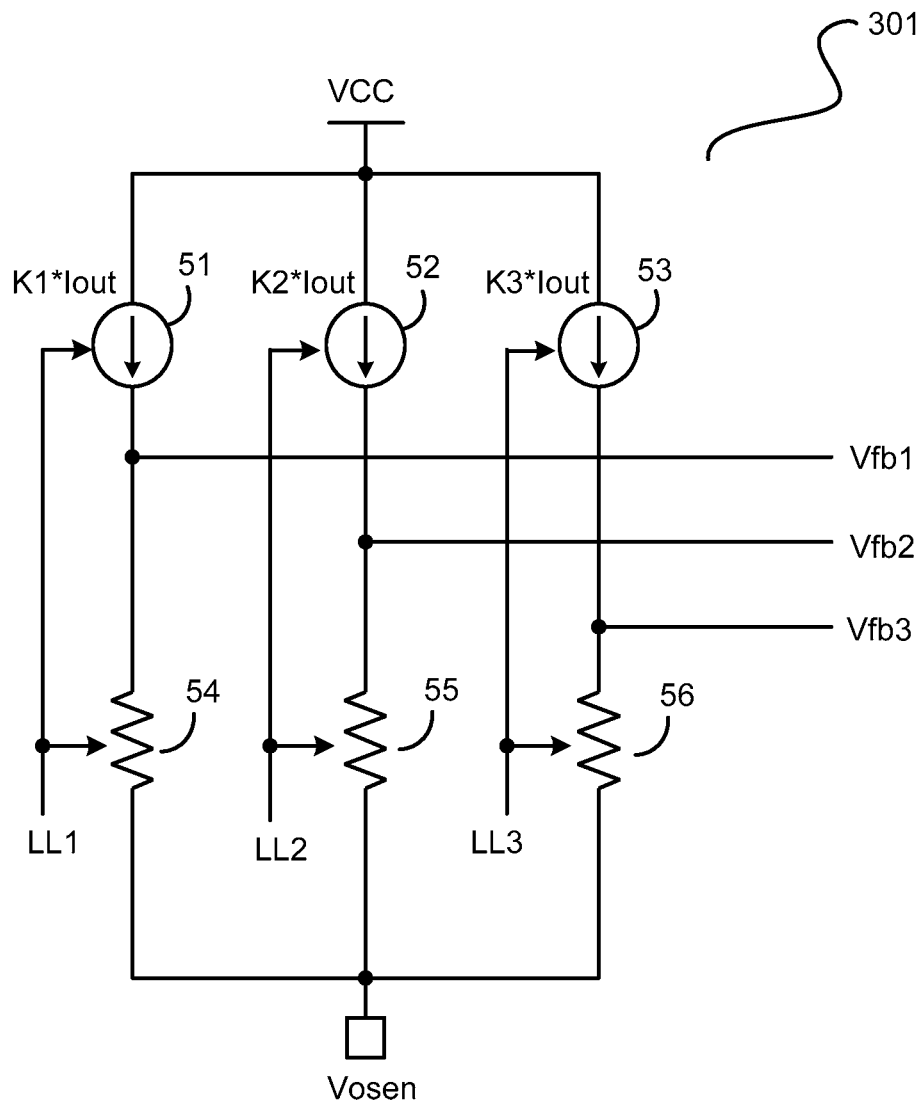
FIG. 5 schematically illustrates a voltage generator 301 in accordance with an embodiment of the present invention.

FIG. 5 schematically illustrates voltage generator 301 in accordance with an embodiment of the present invention. In FIG. 5, voltage generator 301 comprises controllable current sources 51, 52 and 53, and resistors 54, 55 and 56.

Controllable current source 51 is configured to provide a current K1*Iout which is proportional to output current Iout, current K1*Iout flows through resistor 54 to provide feedback signal Vfb1. Resistor 54 has a first terminal coupled to controllable current source 51 and a second terminal coupled to receive voltage sense signal Vosen. Coefficient K1 and a resistance R54 of resistor 54 are controlled based on slope LL1 to satisfy equation (4), that is:

$$K1 * R54 = LL1 \quad (7)$$

Controllable current source 52 is configured to provide a current K2*Iout which is proportional to output current Iout, current K2*Iout flows through resistor 55 to provide feedback signal Vfb2. Resistor 55 has a first terminal coupled to controllable current source 52 and a second terminal coupled to receive voltage sense signal Vosen. Coefficient K2 and a resistance R55 of resistor 55 are controlled based on slope LL2 to satisfy equation (5), that is:

$$K2 * R55 = LL2 \quad (8)$$

Controllable current source 53 is configured to provide a current K3*Iout which is proportional to output current Iout, current K3*Iout flows through resistor 56 to provide feedback signal Vfb3. Resistor 56 has a first terminal coupled to controllable current source 53 and a second terminal coupled to receive voltage sense signal Vosen. Coefficient K3 and a resistance R56 of resistor 56 are controlled based on slope LL3 to satisfy equation (6), that is:

$$K3 * R56 = LL3 \quad (9)$$

In one embodiment, current sources 51, 52 and 53 are adjustable, that is coefficients K1, K2 and K3 are adjustable to satisfy different requirements of slopes LL1, LL2 and LL3, and resistances R54, R55 and R56 are predetermined. In one embodiment, resistances R54, R55 and R56 are adjustable to satisfy different requirements of slopes LL1, LL2 and LL3, and coefficients K1, K2 and K3 are predetermined. In one embodiment, current sources 51, 52 and 53 are adjustable, that is coefficients K1, K2 and K3 are adjustable, and resistances R54, R55 and R56 are adjustable, to satisfy different requirements of slopes LL1, LL2 and LL3.

Figure 6:
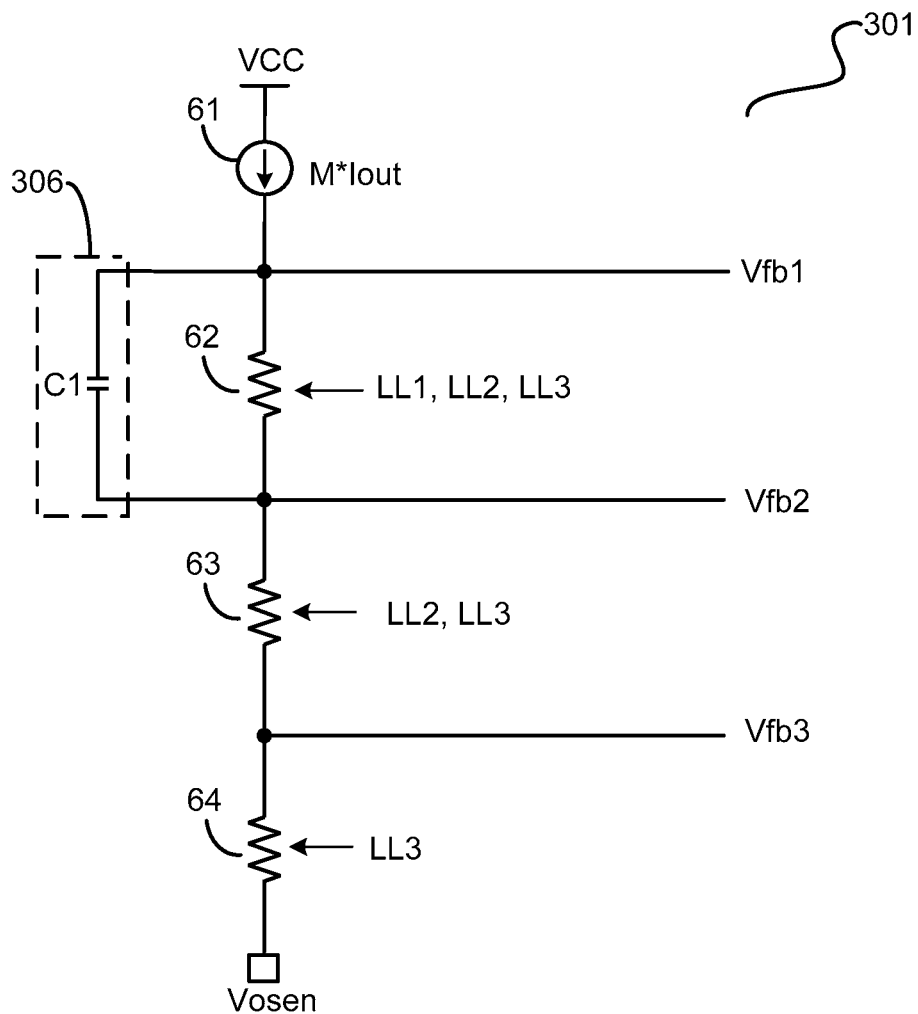
FIG. 6 schematically illustrates voltage generator 301 in accordance with another embodiment of the present invention.

FIG. 6 schematically illustrates voltage generator 301 in accordance with another embodiment of the present invention. In FIG. 6, voltage generator 301 comprises a controllable current source 61, resistors 62, 63 and 64, which are coupled in series. Controllable current source 61 is configured to provide a current M*Iout which is proportional to output current Iout. Resistor 62 has a first terminal coupled to controllable current source 61 to receive current M*Iout and a second terminal, wherein feedback signal Vfb1 is provided at the first terminal of resistor 62, and a resistance R62 of resistor 62 is controlled in response to slope LL1, slope LL2 and slope LL3, e.g., R1=(LL1−LL2−LL3)/M. Resistor 63 has a first terminal coupled to the second terminal of resistor 62 and a second terminal, wherein feedback signal Vfb2 is provided at the first terminal of resistor 63, and a resistance R63 of resistor 63 is controlled in response to slope LL2 and slope LL3, e.g., R2=(LL2−LL3)/M. Resistor 64 has a first terminal coupled to the second terminal of resistor 63 and a second terminal configured to receive voltage sense signal Vosen, wherein feedback signal Vfb3 is provided at the first terminal of resistor 64, and a resistance R64 of resistor 64 is controlled in response to slope LL3, e.g., R3=LL3/M.

In one embodiment as shown in FIG. 6, compensator 306 comprises a capacitor C1 coupled in parallel with resistor 62. Droop voltage Vdroop is generated across resistor 62 and capacitor C1, capacitor C1 filters droop voltage Vdroop to compensate feedback signal Vfb1, so that slope LL1 in practical decreases when output current Iout dramatically increases from less than current I(k1).

Figure 7:
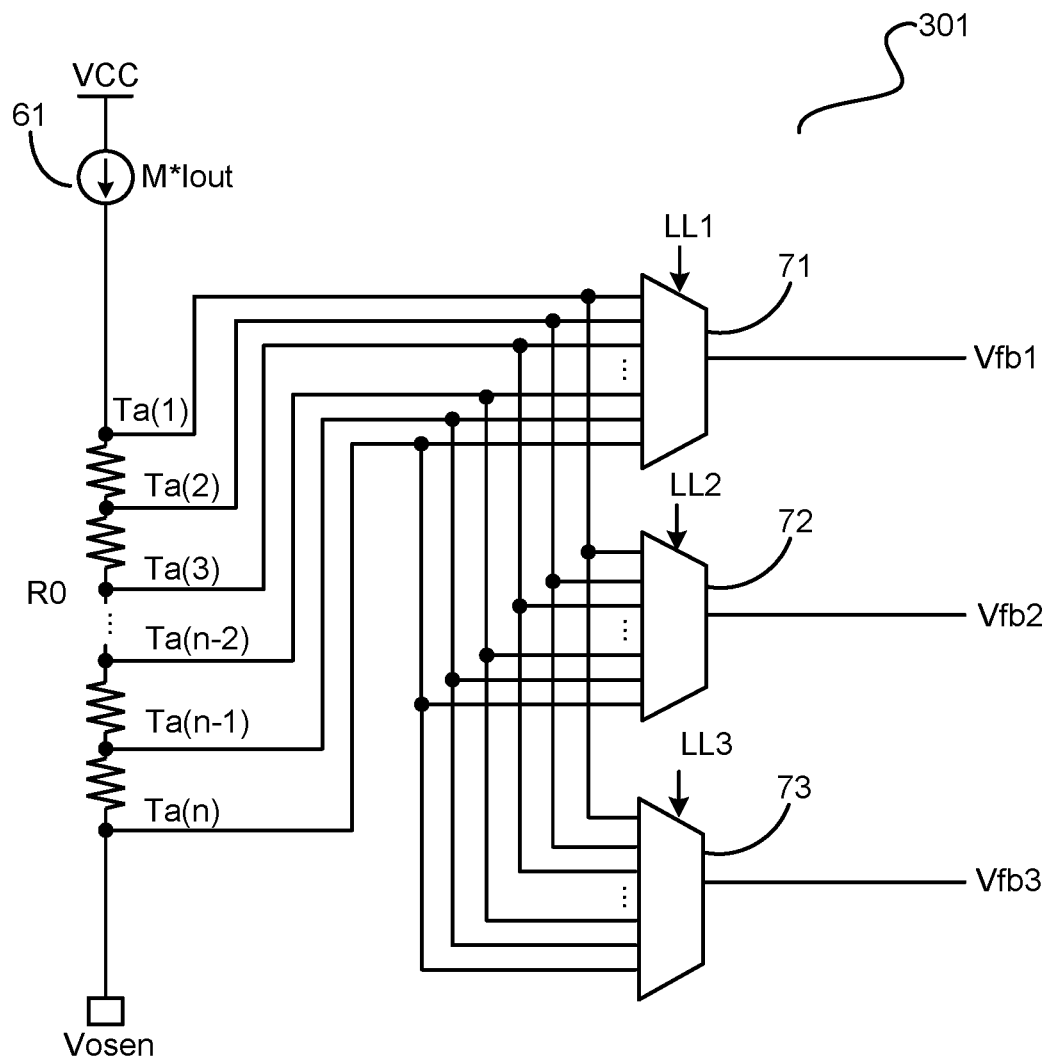
FIG. 7 schematically illustrates voltage generator 301 in accordance with another embodiment of the present invention.

FIG. 7 schematically illustrates voltage generator 301 in accordance with another embodiment of the present invention. In FIG. 7, voltage generator 301 comprises controllable current source 61, a resistor R0, a multiplexer 71, a multiplexer 72, and a multiplexer 73. Resistor R0 has a first terminal coupled to controllable current source 61 to receive current M*Iout, and a second terminal configured to receive voltage sense signal Vosen, and resistor R0 has a plurality of taps Ta(1), Ta(2), . . . Ta(n), each of the plurality of taps has a corresponding voltage. Multiplexer 71 is coupled to the plurality of taps, and is configured to choose one of the plurality of taps to provide feedback signal Vfb1 under control of slope LL1, e.g., to satisfy equation (4). Multiplexer 72 is coupled to the plurality of taps, and is configured to choose one of the plurality of taps to provide feedback signal Vfb2 under control of slope LL2, e.g., to satisfy equation (5). Multiplexer 63 is coupled to the plurality of taps, and is configured to choose one of the plurality of taps to provide feedback signal Vfb3 under control of slope LL3, e.g., to satisfy equation (6).

Figure 8:
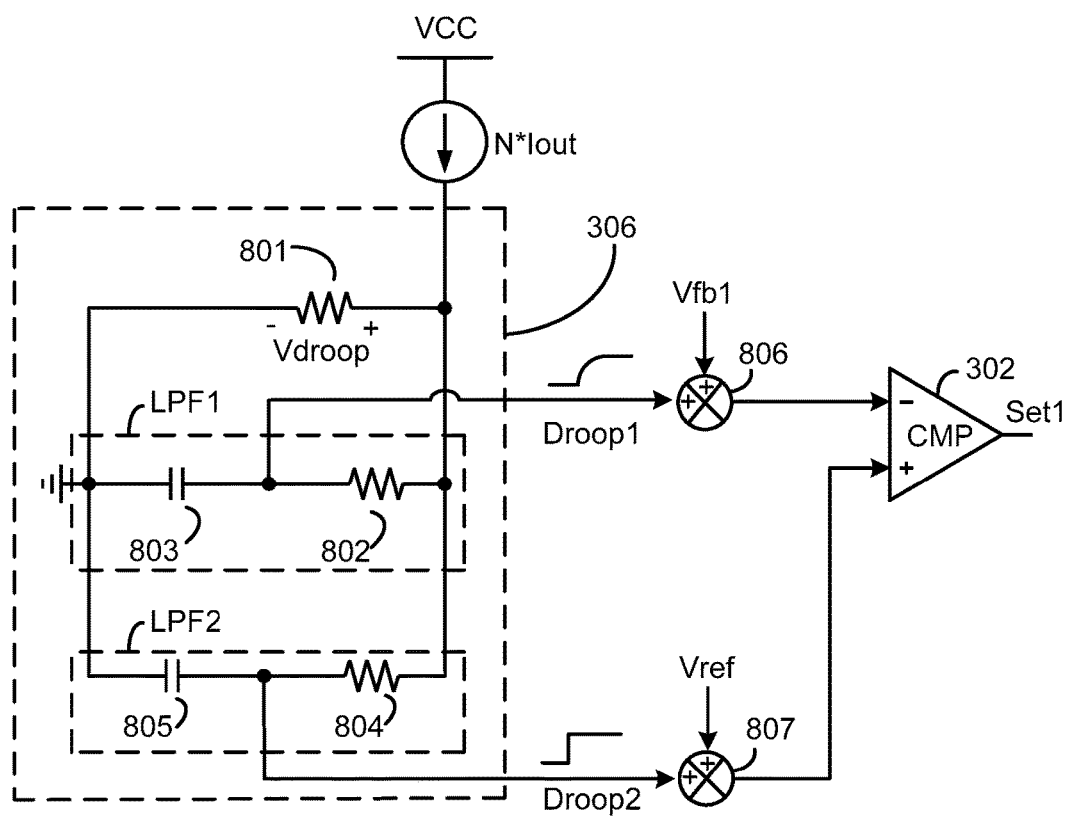
FIG. 8 schematically illustrates a compensator 306 in accordance with an embodiment of the present invention.

FIG. 8 schematically illustrates a compensator 306 in accordance with an embodiment of the present invention. In FIG. 8, compensator 306 provides a compensation signal Droop1 and a compensation signal Droop2 to compensate feedback signal Vfb1. Compensator 306 comprises a droop resistors 801, a filter LPF1 comprising a resistor 802 and a capacitor 803, and a filter LPF2 comprising a resistor 804 and a capacitor 805. A current proportional to output current Iout flows through droop resistor 801 and provides droop voltage Vdroop across droop resistor 801. Filter LPF1 provides compensation signal Droop1 via filtering voltage Vdroop by resistor 802 and capacitor 803. Serially coupled resistor 802 and capacitor 803 are coupled in parallel with droop resistor 801. Compensator 306 provides compensation signal Droop1 at a common node of resistor 802 and capacitor 803. Filter LPF2 provides compensation signal Droop2 via filtering droop voltage Vdroop by resistor 804 and capacitor 805. Serially coupled resistor 804 and capacitor 805 are coupled in parallel with droop resistor 801. Compensator 306 provides compensation signal Droop2 at a common node of resistor 804 and capacitor 805. In one embodiment, compensation signal Droop1 is added to feedback signal Vfb1 through an operational circuit 806, and compensation signal Droop2 is added to reference voltage Vref through an operational circuit 807, wherein a slew rate of compensation signal Droop2 is larger than a slew rate of compensation signal Droop1, and amplitudes of compensation signals Droop1 and Droop2 equal with each other. In another embodiment, compensation signal Droop2 may be subtracted from feedback signal Vfb1.

Figure 9A:
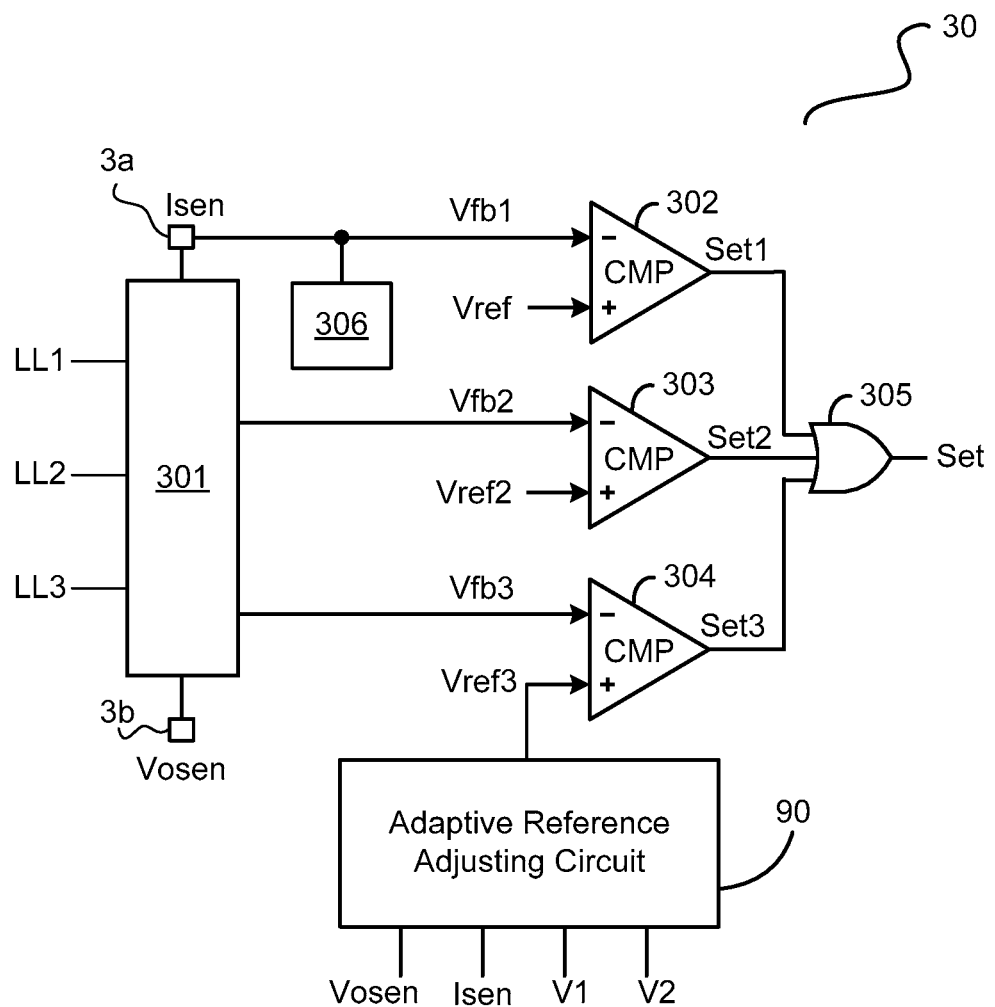
FIG. 9A schematically illustrates nonlinear AVP control circuit 30 with a reference adjusting circuit 90 in accordance with an embodiment of the present invention.

FIG. 9A schematically illustrates nonlinear AVP control circuit 30 with a reference adjusting circuit 90 in accordance with an embodiment of the present invention. Reference adjusting circuit 90 is configured provide adjustable reference voltage Vref3 in response to output voltage Vout and output current Iout. In one embodiment shown in FIG. 9A, reference adjusting circuit 90 receives voltage sense signal Vosen, current sense signal Isen, voltage level V1 and voltage level V2, and provides reference voltage Vref3 accordingly. In one embodiment, reference voltage Vref3 decreases from voltage level V1 to voltage level V2 with a certain slope when voltage sense signal Vosen indicates that output voltage Vout decreases less than a threshold Vth during load step up period, and reference voltage Vref3 increases back to voltage level V1 when current sense signal Isen indicates that load step down happens.

Figure 9B:
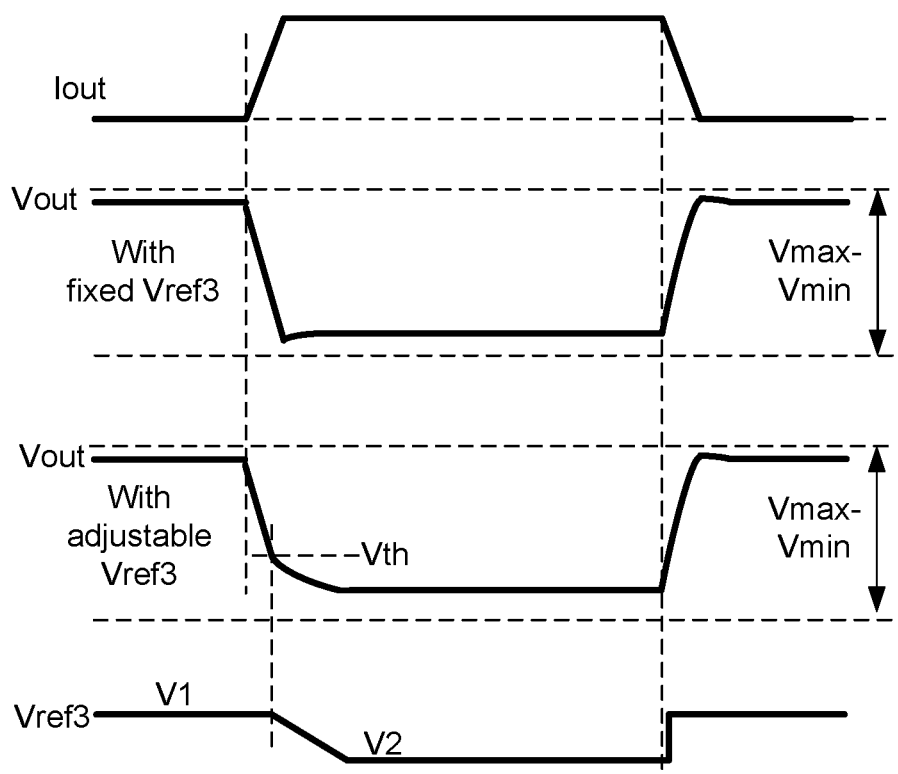
FIG. 9B illustrates waveforms of voltage regulator 300 with fixed reference voltage Vref3 and with adjustable reference voltage Vref3 in accordance with an embodiment of present invention.

FIG. 9B illustrates waveforms of voltage regulator 300 with fixed reference voltage Vref3 and with adjustable reference voltage Vref3 in accordance with an embodiment of present invention. As shown in FIG. 9B, output voltage Vout decreasing to fixed reference voltage Vref3 has undershoot during load step up period. Reference adjusting circuit 90 shown in FIG. 9B is employed to further reduce or eliminate undershoot of output voltage Vout during load step up period. Adjustable reference voltage Vref3 decreases from voltage level V1 to voltage level V2 when output voltage Vout decreases less than threshold Vth during load step up period. Thus output voltage Vout could follow reference voltage Vref3 to decrease without any undershoot. Reference voltage Vref3 increases back to voltage level V1 during load step down period.

Figure 10:
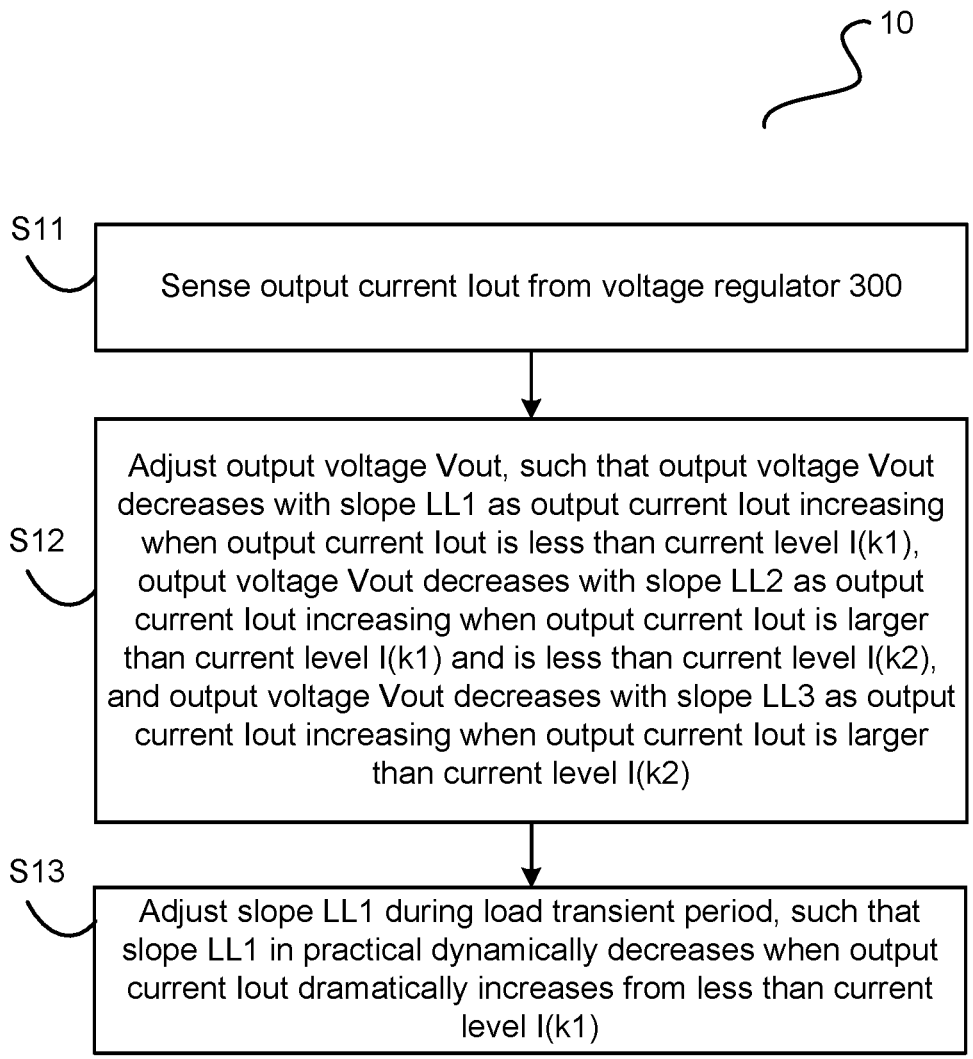
FIG. 10 illustrates a flow chart 10 of voltage regulator 300 in accordance with an embodiment of the present invention.

FIG. 10 illustrates a flow chart 10 of voltage regulator 300 in accordance with an embodiment of the present invention. Flow chart 10 comprises steps S11-S13.

At step S11, sense output current Iout from voltage regulator 300.

At step S12, adjust output voltage Vout, such that output voltage Vout decreases with slope LL1 as output current Iout increasing when output current Iout is less than current level I(k1), output voltage Vout decreases with slope LL2 as output current Iout increasing when output current Iout is larger than current level I(k1) and is less than current level I(k2), and output voltage Vout decreases with slope LL3 as output current Iout increasing when output current Iout is larger than current level I(k2).

At step S13, dynamically adjust slope LL1 during load transient period, such that slope LL1 in practical decreases when output current Iout dramatically increases from less than current level I(k1).

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A voltage regulator, comprising:
 a switching circuit, configured to receive an input voltage and provide an output voltage and an output current; and
 a first control circuit, configured to provide a switching control signal to the switching circuit to adjust the output voltage, such that the output voltage decreases with a first slope as the output current increases when the output current is less than a first current level, the output voltage decreases with a second slope as the output current increases when the output current is larger than the first current level and is less than a second current level, and the output voltage decreases with a third slope as the output current increases when the output current is larger than the second current level; wherein the first control circuit comprises:
 a nonlinear AVP control circuit, configured to provide a set signal in response to the output voltage, the output current, the first slope, the second slope, and the third slope; and
 a switching control circuit, configured to provide the switching control signal to turn ON the switching circuit in response to the set signal.

2. The voltage regulator of claim 1, wherein the first control circuit is further configured to adjust the first slope such that the first slope dynamically decreases when the output current increases from less than the first current level.

3. The voltage regulator of claim 1, wherein the first slope is larger than the second slope, and the second slope is larger than the third slope.

4. The voltage regulator of claim 1, wherein the third slope is zero.

5. The voltage regulator of claim 1, wherein the nonlinear AVP control circuit comprises:
 a voltage generator, configured to provide a first feedback signal in response to the output voltage, the output current and the first slope, configured to provide a second feedback signal in response to the output voltage, the output current and the second slope, and configured to provide a third feedback signal in response to the output voltage, the output current and the third slope;
 a first comparator, configured to provide a first comparison signal based on a comparison result between the first feedback signal and a first reference voltage;
 a second comparator, configured to provide a second comparison signal based on a comparison result between the second feedback signal and a second reference voltage that is lower than the first reference voltage; and
 a third comparator, configured to provide a third comparison signal based on a comparison result between the third feedback signal and a third reference voltage that is lower than the second reference voltage; wherein the first control circuit is configured to provide the switching control signal in response to the first comparison signal, the second comparison signal and the third comparison signal.

6. The voltage regulator of claim 5, wherein the voltage generator further comprises:
 a first controllable current source, configured to provide a first current equaling a first coefficient times the output current;
 a first resistor, coupled to the first controllable current source serially to provide the first feedback signal;
 a second controllable current source, configured to provide a second current equaling a second coefficient times the output current;
 a second resistor, coupled to the second controllable current source serially to provide the second feedback signal;
 a third controllable current source, configured to provide a third current equaling a third coefficient times the output current; and
 a third resistor, coupled to the third controllable current source serially to provide the third feedback signal.

7. The voltage regulator of claim 5, wherein the voltage generator further comprises:
 a controllable current source, configured to provide a current proportional to the output current;
 a first resistor, having a first terminal coupled to the controllable current source and a second terminal, wherein the first terminal is configured to provide the first feedback signal, and a first resistance of the first resistor is controlled in response to the first slope, the second slope and the third slope;
 a second resistor, having a first terminal coupled to the second terminal of the first resistor and a second terminal, wherein the first terminal is configured to provide the second feedback signal, and a second resistance of the second resistor is controlled in response to the second slope and the third slope; and
 a third resistor, having a first terminal coupled to the second terminal of the second resistor and a second terminal coupled to a voltage sense signal representative of the output voltage, wherein the first terminal is configured to provide the third feedback signal, and a third resistance of the third resistor is controlled in response to the third slope.

8. The voltage regulator of claim 5, wherein the voltage generator further comprises:
 a controllable current source, configured to provide a current proportional to the output current;
 a resistor, having a first terminal coupled to the controllable current source and a second terminal coupled to a voltage sense signal representative of the output voltage, the resistor comprises a plurality of taps;
 a first multiplexer, coupled to the plurality of taps, the first multiplexer is configured to choose one of the plurality of taps to provide the first feedback signal under control of the first slope;
 a second multiplexer, coupled to the plurality of taps, the second multiplex is configured to choose one of the plurality of taps to provide the second feedback signal under control of the second slope; and
 a third multiplexer, coupled to the plurality of taps, the third multiplexer is configured to choose one of the plurality of taps to provide the third feedback signal under control of the third slope.

9. The voltage regulator of claim 5, wherein the first control circuit further comprises:
a droop resistor, configured to provide a droop voltage proportional to the output current;
a first filter, configured to provide a first compensation signal with a slow slope via filtering the droop voltage; and
a second filter, configured to provide a second compensation signal with a fast slope via filtering the droop voltage; wherein
the first comparator is configured to provide the first comparison signal via comparing sum of the first feedback signal and the first compensation signal with sum of the first reference voltage and the second compensation signal.

10. The voltage regulator of claim 5, wherein the first control circuit is further configured to adjust the third reference voltage in response to the output voltage and the output current, the third reference voltage decreases from a first voltage level to a second voltage level when the output voltage decreases less than a threshold during load step up period, and the third reference voltage increases back to the first voltage level during load step down period.

11. A control method used in a voltage regulator, the voltage regulator is configured to provide an output voltage and an output current, the control method comprising:
sensing the output current;
adjusting the output voltage based on the output current, such that the output voltage decreases with a first slope as the output current increases when the output current is less than a first current level, the output voltage decreases with a second slope as the output current increases when the output current is larger than the first current level and is less than a second current level, and the output voltage decreases with a third slope as the output current increases when the output current is larger than the second current level; and
providing a set signal in response to the output voltage, the output current, the first slope, the second slope, and the third slope; wherein
the voltage regulator is controlled based on the set signal.

12. The control method of claim 11, further comprising adjusting the first slope such that the first slope dynamically decreases when the output current increases from less than the first current level.

13. The control method of claim 11, wherein the first slope is larger than the second slope, and the second slope is larger than the third slope.

14. The control method of claim 11, wherein the third slope is zero.

15. The control method of claim 11, further comprising:
providing a first feedback signal in response to the output voltage, the output current and the first slope, and providing a first comparison signal by comparing the first feedback signal with a first reference voltage;
providing a second feedback signal in response to the output voltage, the output current and the second slope, and providing a second comparison signal by comparing the second feedback signal with a second reference voltage; and
providing a third feedback signal in response to the output voltage, the output current and the third slope, and providing a third comparison signal by comparing the third feedback signal with a third reference voltage; wherein
the voltage regulator is controlled based on the first comparison signal, the second comparison signal, the set signal, and the third comparison signal.

16. The control method of claim 15, further comprising adjusting the third reference voltage in response to the output voltage, such that the third reference voltage decreases from a first voltage level to a second voltage level when the output voltage decreases less than a threshold during load step up period.

17. A voltage regulator, comprising:
a switching circuit, configured to receive an input voltage and provide an output voltage and an output current; and
a first control circuit, configured to provide a switching control signal to the switching circuit to adjust the output voltage, such that the output voltage decreases with a first slope as the output current increases when the output current is less than a first current level, and the output voltage decreases with a second slope as the output current increases when the output current is larger than the first current level, wherein the first slope is larger than the second slope; wherein the first control circuit comprises:
a nonlinear AVP control circuit, configured to provide a set signal in response to the output voltage, the output current, the first slope, the second slope, and the third slope; and
a switching control circuit, configured to provide the switching control signal to turn ON the switching circuit in response to the set signal.

18. The voltage regulator of claim 17, wherein the nonlinear AVP control circuit comprises:
a voltage generator, configured to provide a first feedback signal in response to the output voltage, the output current and the first slope, and configured to provide a second feedback signal in response to the output voltage, the output current and the second slope;
a first comparator, configured to provide a first comparison signal via comparing the first feedback signal with a first reference voltage; and
a second comparator, configured to provide a second comparison signal via comparing the second feedback signal with a second reference voltage; wherein
the first control circuit is configured to provide the switching control signal in response to the first comparison signal and the second comparison signal.

* * * * *